Figure 1:
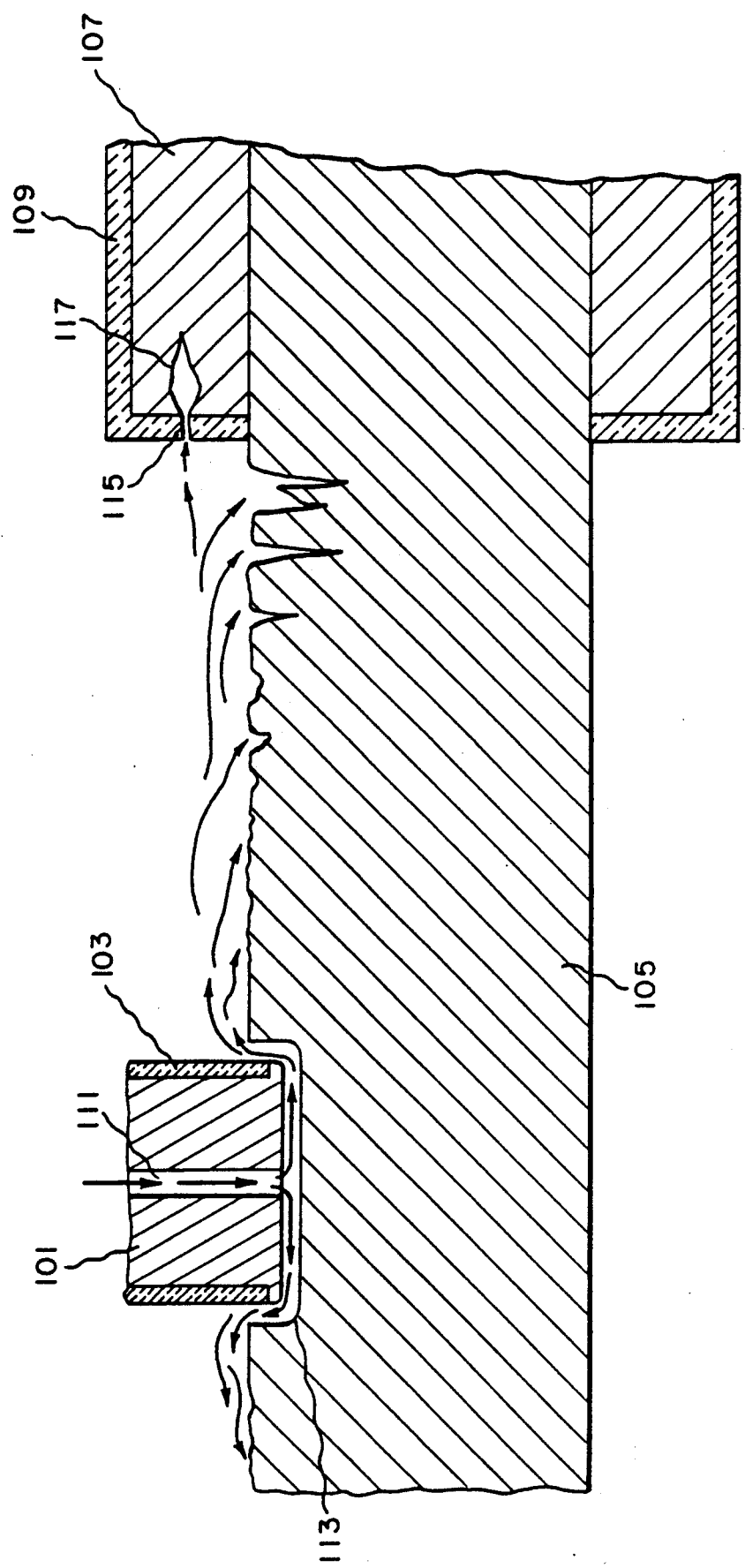

United States Patent [19]

Thornton

[11] Patent Number: 4,997,534
[45] Date of Patent: Mar. 5, 1991

[54] ELECTROCHEMICAL MACHINING WITH AVOIDANCE OF EROSION

[75] Inventor: Roy F. Thornton, Schenectady, N.Y.

[73] Assignee: General Electric Company, Schenectady, N.Y.

[21] Appl. No.: 309,642

[22] Filed: Feb. 13, 1989

[51] Int. Cl.$^5$ .............................................. B23H 3/06
[52] U.S. Cl. .......................... 204/129.1; 204/129.75; 204/290 R; 204/290 F; 428/469
[58] Field of Search ............ 204/129.1, 129.75, 290 R, 204/290 F, 129.65, 32.1, 279, 224 M; 428/469

[56] References Cited

U.S. PATENT DOCUMENTS

| | | | |
|---|---|---|---|
| 3,668,005 | 6/1972 | Sluse et al. | 428/469 X |
| 3,697,401 | 10/1972 | Lucas et al. | 204/129.65 |
| 4,415,905 | 11/1983 | Mitchell et al. | 204/290 F X |
| 4,589,969 | 5/1986 | Yurkov et al. | 204/290 F |
| 4,879,013 | 11/1989 | Austin | 204/290 F X |
| 4,913,973 | 4/1990 | Geusic | 428/469 |

FOREIGN PATENT DOCUMENTS 1813017 6/1970 Fed. Rep. of Germany.

Primary Examiner—Donald R. Valentine
Attorney, Agent, or Firm—William H. Pittman; James C. Davis, Jr.

[57] ABSTRACT

Metal workpieces for electrochemical machining, particularly those comprising titanium and/or aluminum, are protected from pitting by the application of an adherent conductive and protective coating comprising a compound of at least one noble metal selected from the group consisting of ruthenium, rhodium, palladium, iridium and platinum. Said coating protects the workpiece and also catalyzes oxidation of halide and/or water in the electrolyte, which competes successfully with oxidative erosion in the vicinity of faults in the protective coating. Other anodic elements, including clamping fixtures and auxiliary anodes, may also be coated.

20 Claims, 4 Drawing Sheets

ELECTROCHEMICAL MACHINING WITH AVOIDANCE OF EROSION

This invention relates to electrochemical machining, and more particularly to the suppression of pitting and etching of workpieces being electrochemically machined.

Electrochemical machining (hereinafter sometimes "ECM") is a known method of metal working in which the workpiece is the anode of an electrolytic cell, with the cathode comprising a conductive metal such as copper and the electrolyte being a highly ionized aqueous solution. Upon passage of an electric current through the cell, metal is dissolved from the workpiece in a desired pattern; the configuration of the cell and location of the cathode can be designed so as to produce machined articles of a wide variety of shapes.

There are several practical requirements for ECM operations. For example, the current density must be extremely high for efficient machining, with values in the range of about 10–500 amperes per square centimeter being typical. A direct result of this fact is the necessity to maintain a very small gap, typically about 0.1–2.0 mm., between the workpiece and the cathode. As machining proceeds, it is necessary to move the cathode in order to preserve this spacing. In addition, the operation is accompanied by evolution of a very high level of heat, generation of gas bubbles and deposition of precipitates. Problems which might arise from those factors are avoided by pumping electrolyte rapidly through the gap between the workpiece and the cathode. Pumping rates up to 150 liters per second are typical.

It is frequently found that stray currents pass through the electrolyte. Such currents can cause erosion of the workpiece by pitting and/or etching at areas removed, often quite far, from the cathode. Depending on the nature and intended use of the workpiece, it may be necessary to employ such tedious, expensive procedures as hand buffing to remove the results of such erosion. If buffing is carried too far, certain high-precision articles may have to be discarded, at great expense.

It is sometimes possible to suppress erosion by choosing an electrolyte which minimizes stray currents, thereby confining the machining operation to the desired area of the workpiece. However, suppression of pitting by choice of electrolyte is not always possible, particularly when the workpiece comprises a metal such as titanium, aluminum or alloys thereof. Such metals oxidize to form passive oxide coatings which serve as insulating layers and inhibit ECM. For the operation to be successful, it is necessary to remove the passive coating in the area to be machined. A highly polar electrolyte, most often an aqueous alkali metal salt, is capable of removing the passive coating and is therefore normally used in ECM processes involving those metals. These highly conductive liquids, however, are also good carriers of stray currents. As a result, severe erosion of the workpiece in undesired areas often occurs. It would be desirable to provide a coating to replace the passive oxide and protect the workpiece in areas not being machined.

Reactions which compete with oxidation of the workpiece include oxidation of halide ions and/or water in the electrolyte, to generate elemental halogens (typically chlorine or bromine) and elemental oxygen, respectively. It would also be desirable to promote such competing reactions in areas of the ECM cell where the actual machining operation is not being conducted, so as to suppress erosion even if minor defects are present in the protective coating.

In some ECM cells, an auxiliary anode is employed in areas close to the actual site of machining of the workpiece, said auxiliary anode being maintained at a potential equal to or higher than that of the workpiece so as to absorb and neutralize the aforementioned stray currents. When such auxiliary anodes are employed, they are themselves subject to erosion. It may also occur in other anodic elements of the system; for example, holding fixtures for the workpiece such as metallic clamps (typically brass, bronze or stainless steel). Such holding devices are frequently coated with an insulating layer, but faults therein may occur and the consequent erosion could result in catastrophic failure.

The present invention is based on the discovery that salts of certain noble metals can be employed to form a conductive and protective coating on anodic elements in ECM cells. Such coatings are frequently capable of easy removal in the actual area being machined; in other areas, however, they remain in place. They also catalyze the oxidation of halogen and oxygen in the electrolyte, substantially inhibiting the occurrence of erosion in the vicinity of faults in the coating.

In one of its aspects, therefore, the invention is a method for electrochemically machining a metal workpiece which comprises applying a direct electric current to said workpiece as at least one anode in an electrolytic cell also comprising a cathode and an aqueous alkali metal salt solution as electrolyte, at least one anodic element in said cell bearing an adherent conductive coating comprising a compound of at least one noble metal selected from the group consisting of ruthenium, rhodium, palladium, iridium and platinum; said current being applied for a time effective to machine said workpiece.

Figure 2:
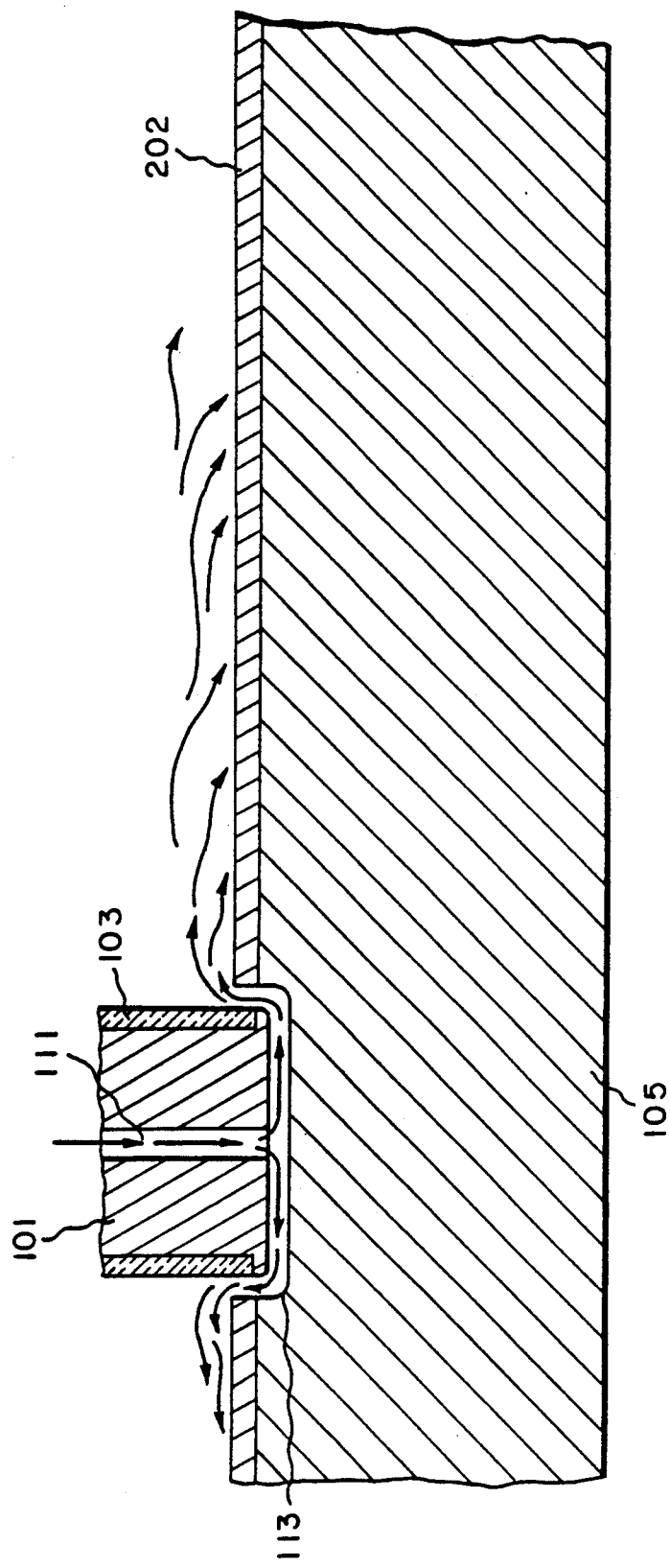
Figure 3:
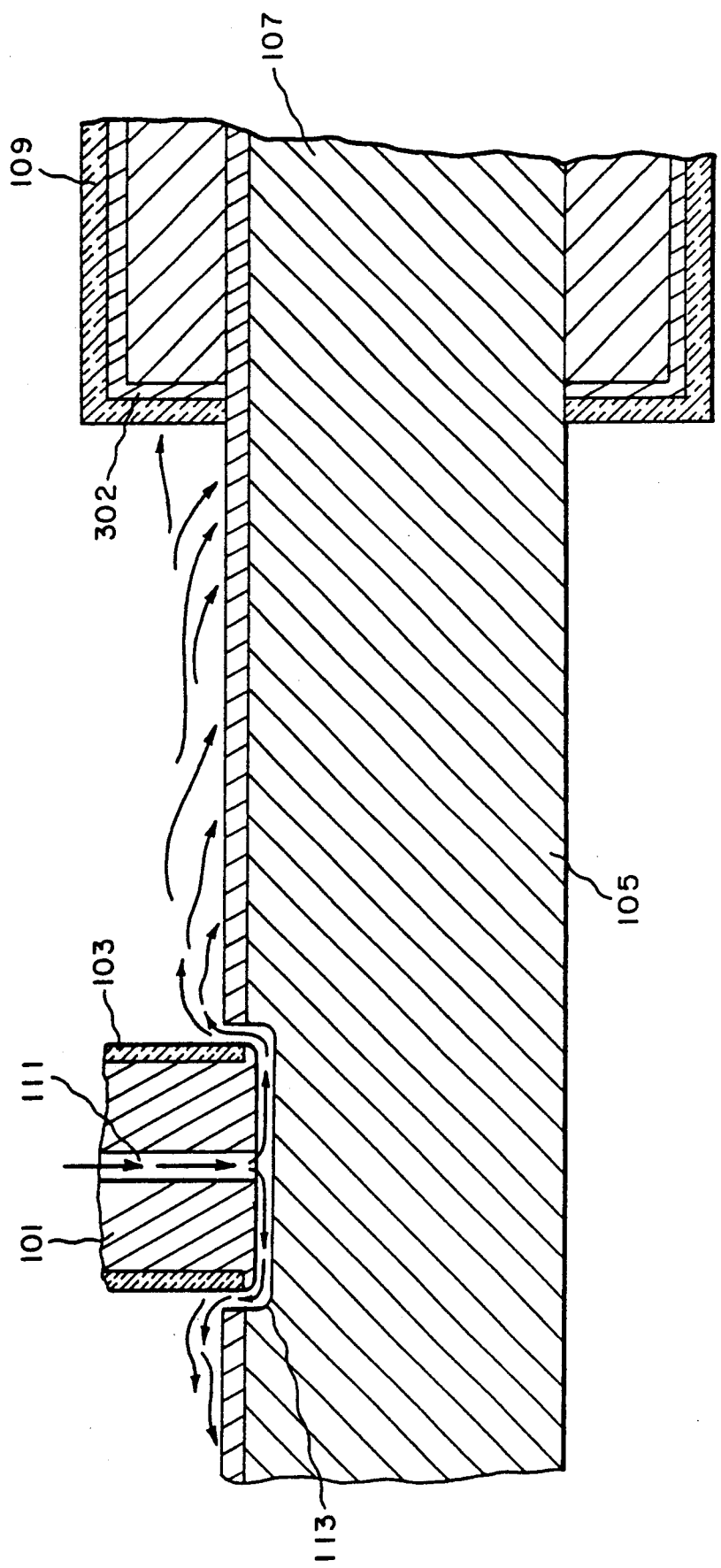
Figure 4:
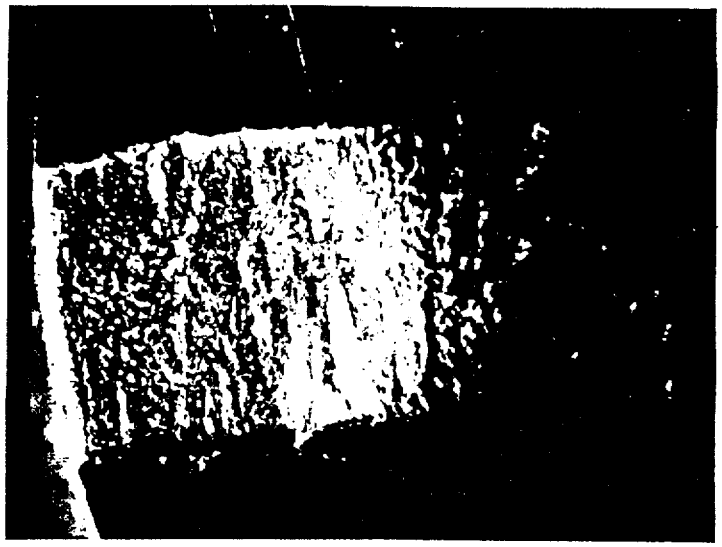
Figure 5:
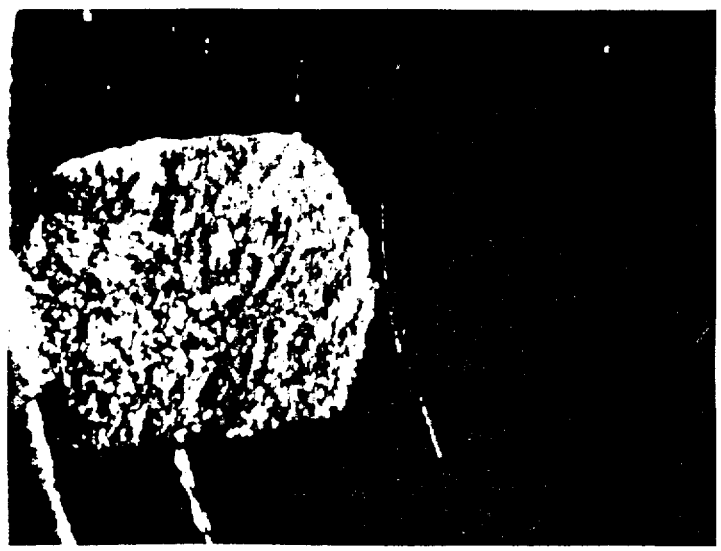

The invention will be described in part with reference to the drawings, in which FIG. 1 is a schematic representation of the essential features of an ECM cell of the prior art;

FIGS. 2 and 3 are similar representations of embodiments of ECM cells in which the present invention is employed; and FIGS. 4 and 5 are respectively photographs of electrochemically machined areas of titanium alloy test pieces produced according to the prior art and according to the method of this invention.

The invention is applicable to ECM operations performed on any metal workpiece; suitable metals include steel, titanium, nickel, cobalt, aluminum, chromium and alloys thereof. It is particularly advantageous with workpieces comprising a major proportion of titanium or aluminum and especially titanium.

Any art-recognized cathode material and any aqueous alkali metal salt electrolyte known in the art may be used in the ECM cell. Solutions of at least one alkali metal (preferably sodium) chloride, bromide, iodide, nitrate, chlorate, perchlorate and/or sulfate, typically of the order of about 5–25% w/v concentration, are typical electrolytes; the sodium halides (especially chloride and bromide) are often preferred by reason of their effectiveness and low cost. Conventional additives may also be present.

An essential feature of the invention is the formation of a protective coating on at least one anodic element in the cell with one or more noble metal compounds from a certain class. By "anodic element" is meant any conductive element of the cell which serves as an anode; that is, which is at a positive potential with reference to the cathode. Included are the workpiece itself, any clamps or other holding fixtures for the workpiece, and any auxiliary anodes. It is generally most important to protect the workpiece itself, and a particularly preferred embodiment of the invention therefore involves coating the workpiece.

The coating is typically provided by application to the workpiece of a solution of a salt of the noble metal in a suitable solvent. The actual metal from this class which is employed will depend to some extent on the circumstances.

For coating the workpiece itself, palladium salts are generally preferred since the coating produced thereby is often removed spontaneously in the ECM cell by an alkali metal chloride and/or fluoride electrolyte to expose the metal surface in areas of high current density, particularly those actually being machined. On the other hand, removal does not take place in areas of lower current density, remote from the cathode. As a result, the palladium salt coating is protectively effective where desired and does not inhibit machining in areas where machining is intended.

For coating auxiliary electrodes and holding fixtures, a ruthenium salt is often preferred. Ruthenium compounds remain on the surface of the anodic element at essentially all current densities encountered in ECM operations and with all electrolytes, and the coatings comprising it are therefore relatively permanent. The invention also contemplates employing a ruthenium compound coating on the workpiece and removing said coating in the area to be machined by art-recognized means such as abrading, scraping or buffing prior to the ECM operation; it may also be necessary to employ such auxiliary removal steps with a palladium coating if the electrolyte comprises an alkali metal bromide.

Coatings comprising iridium and platinum salts are also somewhat more permanent than those comprising palladium salts. They may be preferred when an alkali metal bromide electrolyte is employed, but must be removed in the area to be machined as described above.

The solvent for the noble metal salt solution may be any liquid which dissolves said salt. Water and organic liquids, especially relatively volatile organic liquids, are illustrative, volatility being preferred in order to facilitate removal of the solvent by evaporation. Lower alkanols, particularly those containing up to about 5 carbon atoms, are often particularly suitable. The concentration of the solution is not critical; about 1–10% by weight of the noble metal salt is typical.

It is frequently advantageous to include in the coating solution a viscosity increasing material, generally in the amount of about 5–15% of the solution by weight. The resulting viscosity increase aids uniform spreading of the coating solution on the workpiece.

As a viscosity increasing material, any relatively inert substance which is soluble in the coating solution may be employed. Resinous materials, especially synthetic polymers, are often preferred. The identity of the resinous material is not critical, any such material which can be easily removed (e.g., by burning off before initiation of the ECM operation) being suitable.

Conventional means such as brushing, roller coating, dip coating, spraying or curtain coating may be employed to coat the metal workpiece with the noble metal salt solution. More than one coating step may be employed, to produce a coating of the desired thickness.

Following the coating operation, the solvent is ordinarily removed by evaporation. The workpiece is then oxidatively baked, typically at a temperature of at least about 350° C. and most often in the range of about 350°–500° C. This baking operation removes any viscosity increasing material and forms the desired adherent conductive and protective coating on the workpiece. Said coating is believed to comprise one or more oxides of the noble metal, probably in combination with oxides of the workpiece metal. The thickness of the coating thus formed is generally in the range of about 25–300 micrograms of noble metal per square centimeter. Values in the range of about 10014 200 micrograms/cm.$^2$ are preferred.

Another aspect of the invention is electrochemically machinable anodic workpieces comprising principally at least one of metallic titanium and aluminum and having an adherent conductive and protective coating on only the portion thereof which is not to be machined; said coating comprising a compound of said noble metals, and being of a thickness effective to inhibit erosion upon electrochemical machining of said workpiece.

The workpiece is mounted in the ECM cell as the anode, with prior removal of the coating in the immediate area of machining if necessary, and the ECM operation is started. The adherent coating protects the workpiece by physically blocking erosion by stray currents, and also by catalyzing oxidation of halide ions and/or water in the electrolyte to elemental halogen and/or oxygen, said reactions competing successfully with oxidative erosion.

Following machining of the workpiece to the desired extent, the protective coating may be removed. For removal of palladium compounds, it is frequently convenient to cathodize the workpiece and thereby reduce the palladium in the coating to the elemental state, after which it may be easily wiped off by conventional means. For removal of other noble metals such as ruthenium, the aforementioned physical removal methods may be necessary.

Referring now to the drawings, FIG. 1 schematically represents the essential portions of a conventional ECM cell including cathode 101 partially covered by insulating coating 103, and anodic workpiece 105, held in place by steel clamp 107 which bears insulating coating 109. Electrolyte may be pumped into the cell through an orifice 111 in cathode 101, whereupon it flows into contact with and around workpiece 105 as indicated by the arrows, or it may be pumped from another portion of the cell. A direct electric current is passed through the cell whereby anode 105 is at a positive potential with respect to cathode 101, and machining results in the formation of recess 113 in the workpiece.

During the ECM process, stray currents disperse through the electrolyte and are shown as penetrating the passive oxide layer at various points between recess 113 and clamp 107, causing erosion to form etched areas and/or pits of various sizes. Such stray currents may also attack clamp 107 through flaw 115 in insulating layer 109, causing a sizable pit 117 in the clamp. If there are numerous flaws in the insulating layer and pitting continues, failure of the clamp may occur.

One embodiment of the invention is shown in FIGURE 2, which does not show the clamp since its presence is irrelevant to this embodiment. The workpiece contains conductive and protective coating 202, typically produced by the application of a solution of a palladium salt and a soluble polymer in a lower alkanol followed by evaporation of the alkanol and baking. These operations cause the formation of a palladium compound (probably an oxide and/or a mixed oxide with the workpiece metal) which protects the surface of workpiece 105 by both its physical presence and its catalytic action with respect to oxidation of halide and water in the electrolyte. Thus, erosion is eliminated or substantially decreased.

In the embodiment shown in FIG. 3, clamp 107 contains conductive and protective coating 302, typically formed by the similar action of a ruthenium compound. It may also contain an insulating layer 109. The ruthenium salt is similarly converted by baking to an adherent coating which protects the clamp against erosion by stray currents.

The invention is illustrated by a procedure in which a titanium alloy cylinder, 25.4 mm. in diameter and 17.8 mm. long, was polished on one end and the polished end was painted with a solution of 0.25 gram of palladium (II) chloride and 0.65 gram of polyvinylbutyral in 10 grams of 1-butanol, after which the coated cylinder was dried and baked in air at 400° C. for ¼ hour. Two more coatings were applied and baked in the same manner, except that the final heating step was at 450° C. The coating was then scribed, using a carbide-tipped scriber, with 5 concentric circles, 1–4 mm. apart, to simulate the formation of faults in the protective coating.

The coated cylinder was placed in an ECM cell in proximity to a copper cathode with a face 3.2 mm. in diameter, spaced 0.5 mm. from the face of the cylinder near its edge. As electrolyte, an aqueous solution comprising 90 grams of sodium chloride per liter of solution was employed.

An electric current was passed through the cell, with the titanium workpiece serving as the anode, at a current density of 31 A./cm.$^2$, for a period of time sufficient to etch a depression 0.18–0.25 mm. deep in the absence of chlorine or oxygen gas evolution. As a control, an identical uncoated cylinder was etched in the same way.

In the control experiment, the rate of metal removal was 7.7 mg./A.-min. The cylinder was badly pitted, as shown in FIG. 4. The rate of metal removal according to the invention was 7.2 mg./A.-min., and pitting was essentially absent as shown in FIG. 5. Similar results were observed at a current density of 62 A./cm.$^2$.

Similar results were also obtained when ruthenium-(II) chloride was substituted for the palladium chloride; however, the palladium could be removed by cathodization followed by rubbing with cloth after completion of the ECM operation, while the ruthenium could not. Coatings comprising platinum, rhodium and iridium could be formed in the same manner as those comprising ruthenium, and functioned protectively in electrolytes comprising aqueous sodium bromide.

What is claimed is:

1. A method for electrochemically machining a metal workpiece which comprises applying a direct electric current to said workpiece as at least one anode in an electrolytic cell also comprising a cathode and an aqueous alkali metal salt solution as electrolyte, at least one anodic element in said cell bearing an adherent conductive coating comprising a compound of at least one noble metal selected from the group consisting of ruthenium, rhodium, palladium, iridium and platinum; said current being applied at a current density in the range of about 10–500 amperes per square centimeter, with a gap of about 0.1–2.0 mm. between electrolyte through said gap, for a time effective to machine said workpiece.

2. A method according to claim 1 wherein the workpiece comprises principally titanium or aluminum.

3. A method according to claim 2 wherein the electrolyte is at least one of sodium chloride and sodium bromide.

4. A method according to claim 2 wherein the coating is applied by application to the workpiece of a solution of a salt of the noble metal in a solvent, followed by evaporation of the solvent and oxidative baking.

5. A method according to claim 4 wherein the solvent is a lower alkanol.

6. A method according to claim 5 wherein the workpiece comprises principally titanium.

7. A method according to claim 6 wherein the thickness of the coating is in the range of about 25–300 micrograms of metal per square centimeter.

8. A method according to claim 7 wherein the workpiece is coated with a palladium compound.

9. A method according to claim 8 wherein the electrolyte comprises at least one of sodium chloride and sodium bromide.

10. A method according to claim 9 wherein the noble metal salt solution also contains a viscosity increasing material.

11. A method according to claim 10 wherein the viscosity increasing material is a synthetic polymer.

12. A method according to claim 11 wherein the thickness of the coating is in the range of about 100–200 micrograms of metal per square centimeter.

13. A method according to claim 12 wherein anodic elements other than the workpiece are coated with a ruthenium compound.

14. A method according to claim 13 wherein the workpiece is coated with a palladium salt.

15. A method according to claim 14 wherein the electrolyte comprises at least one of sodium chloride and sodium bromide.

16. An electrochemically machined article comprising principally at least one of metallic titanium and aluminum and having an adherent conductive and protective coating on only the portion thereof which is not machined; said coating comprising a compound of at least one noble metal selected from the group consisting of ruthenium, rhodium, palladium, iridium and platinum, and being of a thickness effective to inhibit erosion under electrochemical machining conditions.

17. An article according to claim 16 wherein the thickness of the coating is in the range of about 25–300 micrograms of metal per square centimeter.

18. An article according to claim 17 which comprises principally titanium.

19. An article according to claim 18 wherein the thickness of the coating is in the range of about 100–200 micrograms of metal per square centimeter.

20. An article according to claim 19 wherein the coating comprises a compound of palladium.

* * * * *

UNITED STATES PATENT AND TRADEMARK OFFICE
CERTIFICATE OF CORRECTION

PATENT NO. : 4,997,534

DATED : March 5, 1991

INVENTOR(S) : Roy F. Thornton

It is certified that error appears in the above-identified patent and that said Letters Patent is hereby corrected as shown below:

The sheet of drawing consisting of Figs. 4 and 5, should be added as shown on the attached page.

Signed and Sealed this

Twenty-fifth Day of August, 1992

Attest:

DOUGLAS B. COMER

*Attesting Officer*      *Acting Commissioner of Patents and Trademarks*